US010996840B1

(12) United States Patent
 Singh

(10) Patent No.: US 10,996,840 B1
(45) Date of Patent: May 4, 2021

(54) SYSTEMS AND METHODS FOR PROVIDING USER-FRIENDLY ACCESS TO RELEVANT HELP DOCUMENTATION FOR SOFTWARE APPLICATIONS

(71) Applicant: Juniper Networks, Inc., Sunnyvale, CA (US)

(72) Inventor: Neha Singh, Sunnyvale, CA (US)

( * ) Notice: Subject to any disclaimer, the term of this patent is extended or adjusted under 35 U.S.C. 154(b) by 0 days.

(21) Appl. No.: 16/551,058

(22) Filed: Aug. 26, 2019

(51) Int. Cl.
 *G06F 3/0486* (2013.01)
 *G06F 3/0482* (2013.01)
 *G06F 3/0481* (2013.01)
(52) U.S. Cl.
 CPC ......... *G06F 3/0486* (2013.01); *G06F 3/0482* (2013.01); *G06F 3/04817* (2013.01)
(58) Field of Classification Search
 None
 See application file for complete search history.

(56) References Cited

U.S. PATENT DOCUMENTS

| | | | | |
|---|---|---|---|---|
| 2009/0193351 A1* | 7/2009 | Lee | ..................... | G06F 16/639 715/769 |
| 2012/0124068 A1* | 5/2012 | Toyama | .................. | G06F 16/93 707/758 |
| 2013/0263032 A1* | 10/2013 | Vainio | ................. | G06F 3/04842 715/765 |
| 2014/0096054 A1* | 4/2014 | Yang | ....................... | G06F 9/453 715/769 |
| 2014/0289662 A1* | 9/2014 | Morita | ................ | G06F 3/04883 715/769 |
| 2014/0298253 A1* | 10/2014 | Jin | ...................... | G06F 3/04883 715/790 |
| 2014/0372932 A1* | 12/2014 | Rutherford | ............ | G06F 9/451 715/776 |
| 2015/0012818 A1* | 1/2015 | Reichmann | ......... | G06F 3/04842 715/236 |
| 2015/0012862 A1* | 1/2015 | Ikeda | .................... | G06F 3/0485 715/770 |

* cited by examiner

*Primary Examiner* — Toan H Vu
(74) *Attorney, Agent, or Firm* — FisherBroyles, LLP

(57) ABSTRACT

A disclosed method may include (1) providing a graphical drag-and-drop icon for visual presentation to a user within a user interface of a software application, (2) detecting a drag action performed by the user on the graphical drag-and-drop icon relative to the user interface, (3) detecting a drop action performed by the user on the graphical drag-and-drop icon relative to the user interface, (4) determining, based at least in part on a location of the drop action relative to the user interface, that the user dropped the graphical drag-and-drop icon on a specific feature of the user interface, and then in response to determining that the user dropped the graphical drag-and-drop icon on the specific feature of the user interface, (5) providing help documentation associated with the specific feature of the user interface for visual presentation to the user. Various other systems and methods are also disclosed.

18 Claims, 10 Drawing Sheets

SYSTEMS AND METHODS FOR PROVIDING USER-FRIENDLY ACCESS TO RELEVANT HELP DOCUMENTATION FOR SOFTWARE APPLICATIONS

BACKGROUND

Many software applications accomplish impressive feats. In some cases, software applications may simplify and/or automate users' responsibilities. Additionally or alternatively, software applications may manage and/or monitor the capabilities, functionalities, and/or statistics of certain systems, devices, or networks. Unfortunately, some software applications may have steep learning curves that frustrate users and/or discourage them from acquiring certain application-specific skills and/or know-how.

To address and/or alleviate such problems, many software vendors may develop and/or provide help documentation aimed at instructing users on how to accomplish certain tasks. Unfortunately, some help documentation may be cumbersome, unwieldy, and/or not user-friendly. For example, a user may thoroughly search a software application's help documentation for a solution to his or her problem. In this example, the help documentation may contain information describing the solution to the user's problem. However, the user's search efforts may be in vain as his or her search is unsuccessful for one reason or another.

The instant disclosure, therefore, identifies and addresses a need for additional and improved systems and methods for providing user-friendly access to relevant help documentation for software applications.

SUMMARY

As will be described in greater detail below, the instant disclosure generally relates to systems and methods for providing user-friendly access to relevant help documentation for software applications. In one example, a method for accomplishing such a task may include (1) providing a graphical drag-and-drop icon for visual presentation to a user within a user interface of a software application, (2) detecting a drag action performed by the user on the graphical drag-and-drop icon relative to the user interface of the software application, (3) detecting a drop action performed by the user on the graphical drag-and-drop icon relative to the user interface of the software application, (4) determining, based at least in part on a location of the drop action relative to the user interface, that the user dropped the graphical drag-and-drop icon on a specific feature of the user interface, and then in response to determining that the user dropped the graphical drag-and-drop icon on the specific feature of the user interface, (5) providing help documentation associated with the specific feature of the user interface for visual presentation to the user.

Similarly, a system that implements the above-identified method may include a physical processor configured to execute various modules stored in memory. In one example, this system may include and/or execute (1) an icon module that provides a graphical drag-and-drop icon for visual presentation to a user within a user interface of a software application, (2) a detection module that (A) detects a drag action performed by the user on the graphical drag-and-drop icon relative to the user interface of the software application and (B) detects a drop action performed by the user on the graphical drag-and-drop icon relative to the user interface of the software application, (3) a determination module that determines, based at least in part on a location of the drop action relative to the user interface, that the user dropped the graphical drag-and-drop icon on a specific feature of the user interface, and (4) a documentation module that provides help documentation associated with the specific feature of the user interface for visual presentation to the user in response to the determination.

Additionally or alternatively, the above-described method may be encoded as computer-readable instructions on a non-transitory computer-readable medium. For example, a computer-readable medium may include one or more computer-executable instructions that, when executed by at least one processor of a computing device, may cause the computing device to (1) provide a graphical drag-and-drop icon for visual presentation to a user within a user interface of a software application, (2) detect a drag action performed by the user on the graphical drag-and-drop icon relative to the user interface of the software application, (3) detect a drop action performed by the user on the graphical drag-and-drop icon relative to the user interface of the software application, (4) determine, based at least in part on a location of the drop action relative to the user interface, that the user dropped the graphical drag-and-drop icon on a specific feature of the user interface, and then in response to the determination, (5) provide help documentation associated with the specific feature of the user interface for visual presentation to the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
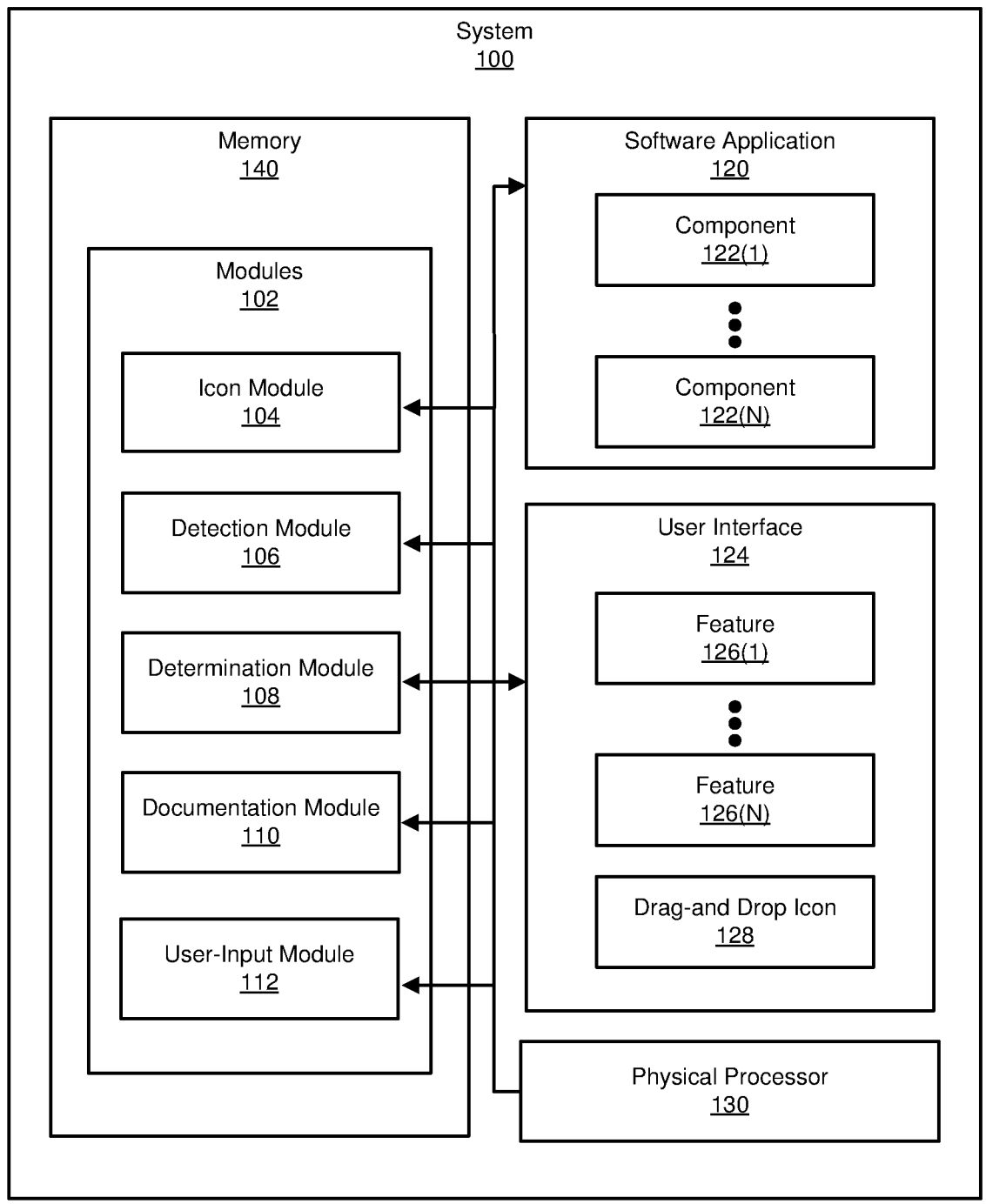
FIG. 1 is a block diagram of an exemplary system for providing user-friendly access to relevant help documentation for software applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for providing user-friendly access to relevant help documentation for software applications. As will be explained in greater detail below, embodiments of the instant disclosure may enable users of software applications to easily and/or efficiently search or obtain help documentation relevant to questions and/or problems experienced by the users. For example, embodiments of the instant disclosure may provide a graphical drag-and-drop icon that the user is able to move across a GUI of a software application. In these embodiments, upon moving the graphical drag-and-drop icon over a feature of interest, the user may drop the icon to initiate a search of the help documentation associated with that feature.

Accordingly, these embodiments may facilitate access to help documentation relevant to the user's feature of interest in a very user-friendly way. By doing so, these embodiments may encourage users to utilize help documentation more frequently to solve their problems and/or issues in connection with software applications. As a result, these embodiments may also mitigate and/or decrease users' demand for customer service aimed at solving their problems and/or issues over the phone, online, and/or in-person.

The following will provide, with reference to FIGS. 1, 2, and 4-9, detailed descriptions of exemplary systems and corresponding implementations for providing user-friendly access to relevant help documentation for software applications. Detailed descriptions of corresponding computer-implemented methods will be provided in connection with FIG. 3. In addition, detailed descriptions of an exemplary computing system for carrying out these methods will be provided in connection with FIG. 10.

FIG. 1 shows an exemplary system 100 that facilitates providing user-friendly access to relevant help documentation for software applications. As illustrated in FIG. 1, system 100 may include one or more modules 102 for performing one or more tasks. As will be explained in greater detail below, modules 102 may include an icon module 104, a detection module 106, a determination module 108, a documentation module 110, and a user-input module 112. Although illustrated as separate elements, one or more of modules 102 in FIG. 1 may represent portions of a single module or application (such as an operating system, a software application, and/or a program).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., computing devices 202 and 206). One or more of modules 102 in FIG. 1 may also represent all or portions of one or more special-purpose computers configured to perform one or more tasks. In some embodiments, modules 102 may all be implemented and/or executed on a single computing device. In other embodiments, modules 102 may be implemented and/or executed across multiple computing devices.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to provide user-friendly access to relevant help documentation for a software application. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include one or more software applications, such as software application 120. In some examples, software application 120 may include and/or represent various components 122(1)-(N). In one example, software application 120 may represent a cloud-based service and/or application. In another example, software application 120 may represent a service and/or application installed and/or executed on a single computing device. Examples of software application 120 include, without limitation, network management applications, device management applications, security software applications, social-networking applications, browsers, file management tools, word processors, spreadsheet applications, budget or accounting applications, portions of one or more of the same, combinations or variations of one or more of the same, and/or any other suitable software application.

As illustrated in FIG. 1, exemplary system 100 may additionally include one or more user interfaces, such as user interface 124. In some examples, user interface 124 may include and/or represent a GUI of software application 120. In one example, user interface 124 may include and/or represent various features 126(1)-(N) and/or a graphical drag-and-drop icon 128. In this example, user interface 124 may provide access to and/or be used to modify or control software application 120. Additionally or alternatively, user interface 124 may represent part of and/or be included in software application 120. In some embodiments, one or more of features 126(1)-(N) from user interface 124 may correspond to and/or represent one or more of components 122(1)-(N) from software application 120. Accordingly, a user may be able to modify and/or control one or more of components 122(1)-(N) of software application 120 via features 126(1)-(N) of user interface 124.

In some examples, graphical drag-and-drop icon 128 may include and/or represent any type or form of graphical representation and/or imagery provided for presentation on a computer monitor and/or display. Graphical drag-and-drop icon 128 may be of any suitable shape, size, and/or color. In one example, graphical drag-and-drop icon 128 may have any suitable filling and/or shading (e.g., solid, semi-transparent, and/or transparent). In one embodiment, graphical drag-and-drop icon 128 may include and/or contain certain text. For example, graphical drag-and-drop icon 128 may include and/or contain some text of language indicating the icon's purpose and/or intended usage to a user.

Figure 2:
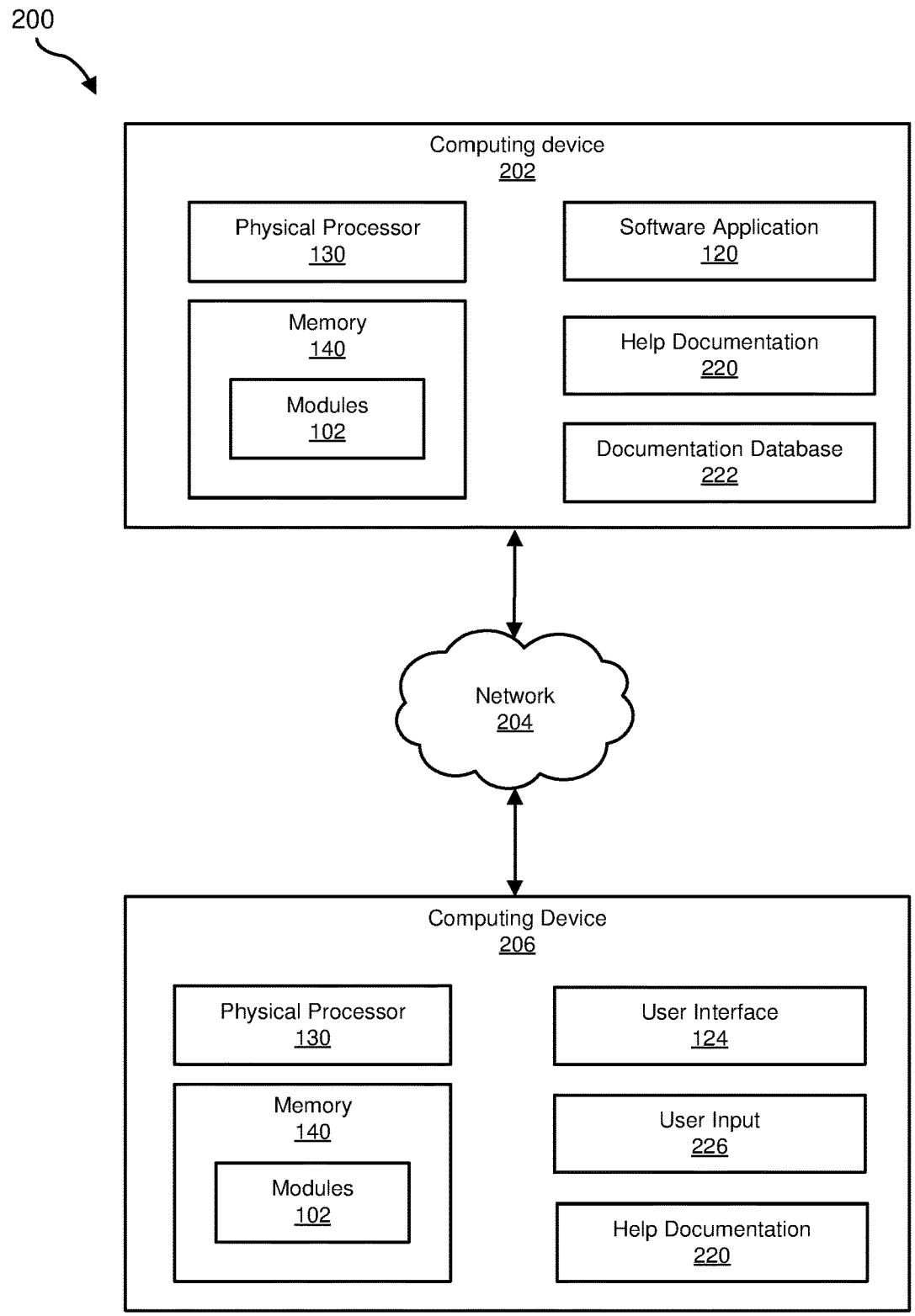
FIG. 2 is a block diagram of an additional exemplary system for providing user-friendly access to relevant help documentation for software applications.

An apparatus or device for providing user-friendly access to relevant help documentation for software applications may include all or portions of exemplary system 100. In some examples, system 100 in FIG. 1 may be implemented in a variety of ways. For example, all or a portion of exemplary system 100 may represent portions of exemplary system 200 in FIG. 2. As shown in FIG. 2, system 200 may include a computing device 202 and a computing device 206 in communication via a network 204. Accordingly, the disclosed systems and methods may be implemented and/or performed as a single computing device (e.g., system 100 in FIG. 1) or as a distributed system of computing devices (e.g., system 200 in FIG. 2).

As illustrated in FIG. 2, computing device 202 may include and/or represent instances of memory 140, physical processor 130, and/or one or more portions of software application 120, help documentation 220, and/or documentation database 222. Similarly, computing device 206 may also include and/or represent instances of memory 140, physical processor 130, and/or one or more portions of user interface 124, user input 226, and/or help documentation 220.

In some examples, and as will be described in greater detail below, one or more of modules 102 may cause one or more of computing devices 202 and 206 to (1) provide graphical drag-and-drop icon 128 for visual presentation to a user within user interface 124 of software application 120, (2) detect a drag action performed by the user on graphical drag-and-drop icon 128 relative to user interface 124 of software application 120, (3) detect a drop action performed by the user on graphical drag-and-drop icon 128 relative to user interface 124 of software application 120, (4) determine, based at least in part on a location of the drop action relative to user interface 124, that the user dropped graphical drag-and-drop icon 128 on one of features 126(1)-(N) of user interface 124, and then in response to that determination, (5) provide help documentation 220 associated with that feature of user interface 124 for visual presentation to the user.

Computing device 202 and computing device 206 each generally represent any type or form of physical computing device capable of reading computer-executable instructions. In one example, computing device 202 may include and/or represent a server that hosts at least a portion of software application 120 for delivery and/or streaming to an administrative and/or end-user device. In this example, computing device 206 may include and/or represent an administrative and/or end-user device that facilitates the visual presentation of user interface 124 of software application 120. Accordingly, computing device 206 may include and/or incorporate a monitor and/or display that provides the visual presentation of user interface 124 to a user. Additional examples of computing device 202 and/or computing device 206 include, without limitation, routers (such as provider edge routers, hub routers, spoke routers, autonomous system boundary routers, and/or area border routers), switches, hubs, modems, bridges, repeaters, gateways, multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable computing devices.

Network 204 generally represents any medium or architecture capable of facilitating communication or data transfer. In one example, network 204 may include computing device 202 and/or computing device 206. Additionally or alternatively, network 204 may include other devices (not necessarily illustrated in FIG. 2) that facilitate communication among computing device 202 and/or computing device 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although not illustrated in this way in FIG. 2, network 204 may also include additional devices (such as client devices, servers, network devices, etc.).

Figure 3:
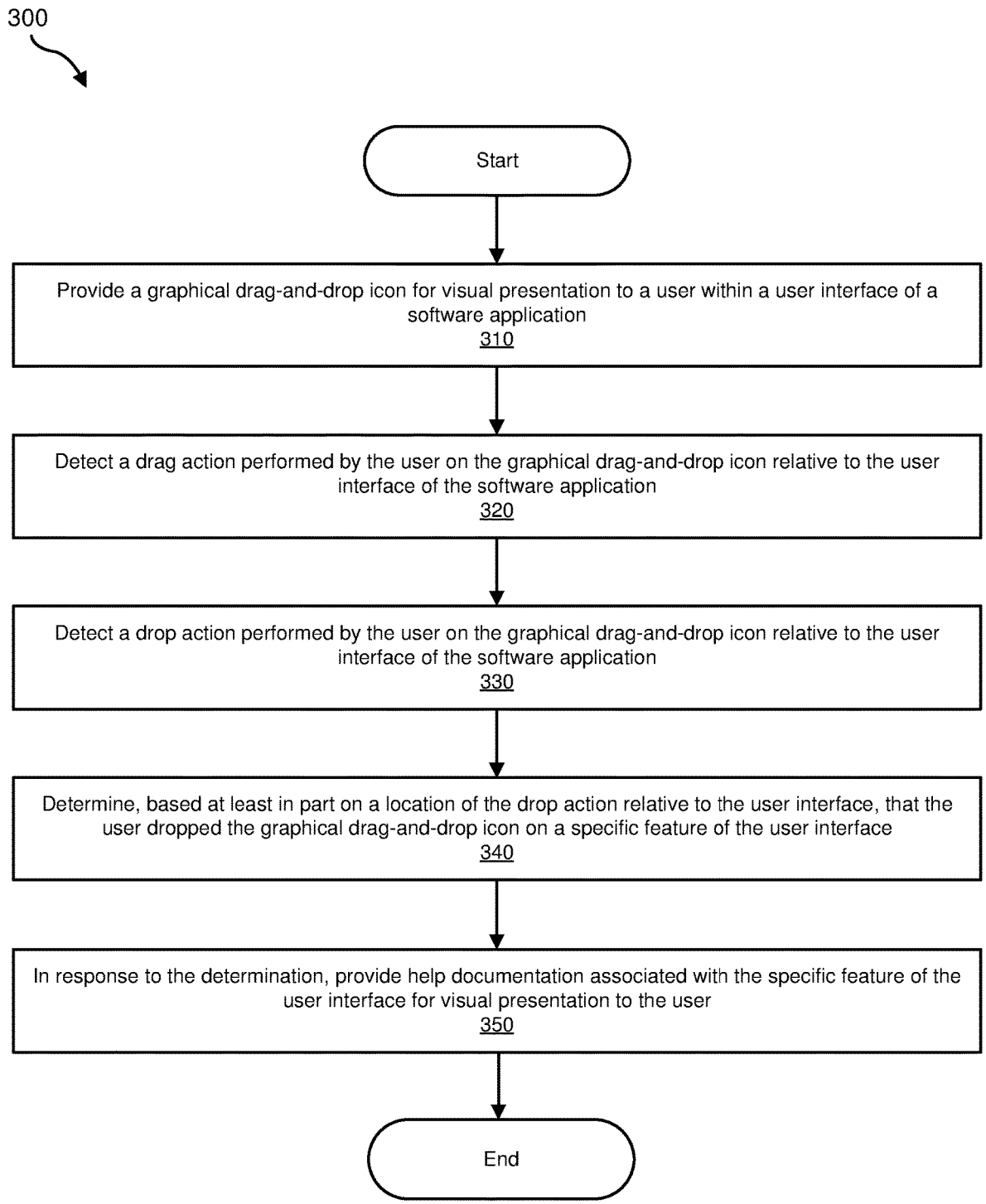
FIG. 3 is a flow diagram of an exemplary method for providing user-friendly access to relevant help documentation for software applications.

FIG. 3 is a flow diagram of an exemplary computer-implemented method 300 for providing user-friendly access to relevant help documentation for software applications. The steps shown in FIG. 3 may be performed by any suitable computer-executable code and/or computing system, including system 100 in FIG. 1, system 200 in FIG. 2, system 1000 in FIG. 10, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may provide a graphical drag-and-drop icon for visual presentation to a user within a user interface of a software application. For example, icon module 104 may, as part of computing device 202 and/or computing device 206 in FIG. 2, provide graphical drag-and-drop icon 128 for visual presentation to a user within user interface 124 of software application 120. In one example, the user may be operating computing device 202 at the time that graphical drag-and-drop icon 128 is provided for visual presentation.

The systems described herein may perform step 310 in a variety of ways and/or contexts. In some examples, icon module 104 may superimpose and/or overlay graphical drag-and-drop icon 128 on user interface 124 of software application 120. In one example, icon module 104 may dock graphical drag-and-drop icon 128 at an origin within user interface 124 for access by the user. In this example, the origin at which graphical drag-and-drop icon 128 is docked may include and/or represent a fixed location that remains stationary relative to user interface 124 as the user scrolls through user interface 124 in a certain direction (e.g., up, down, left, or right). Additionally or alternatively, the origin at which graphical drag-and-drop icon 128 is docked may include and/or represent a mobile location that moves relative to user interface 124 as the user scrolls through user interface 124 in a certain direction (e.g., up, down, left, or right).

Figure 4:
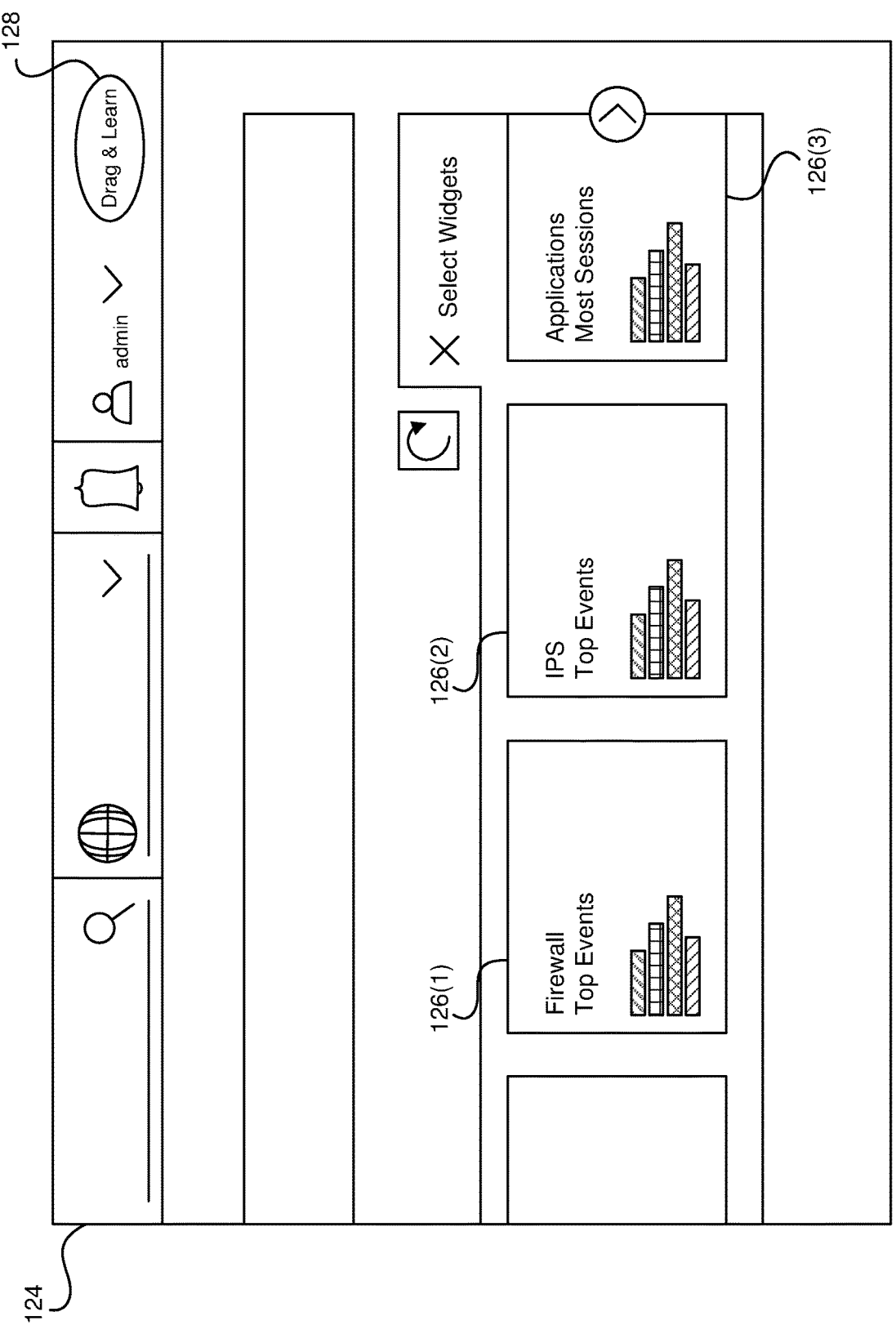
FIG. 4 is an illustration of an exemplary Graphical User Interface (GUI) that includes a graphical drag-and-drop icon with which a user is able to search for relevant help documentation.

FIG. 4 illustrates an exemplary user interface 124 of software application 120. As illustrated in FIG. 4, user interface 124 may include and/or incorporate graphical drag-and-drop icon 128, which is positioned and/or placed in the upper righthand corner. In this example, user interface 124 may include and/or incorporate various features 126(1), 126(2), and/or 126(3). In one embodiment, these features may also include and/or represent widgets of user interface 124. For example, feature 126(1) may represent the top events associated with a firewall of software application 120, feature 126(2) may represent the top events associated with an Intrusion Prevention System (IPS) of software application 120, and/or feature 126(3) may represent a grouping and/or listing of the applications with the most sessions in connection with software application 120.

In one example, the positioning and/or placement of graphical drag-and-drop icon 128 may correspond to and/or represent the origin at which graphical drag-and-drop icon 128 resides and/or is maintained when not utilized and/or moved by the user. In other words, this origin may correspond to and/or represent the effective home of graphical drag-and-drop icon 128 relative to user interface 124. As will be described in greater detail below in connection with FIGS. 5 and 6, the user may be able to drag graphical drag-and-drop icon 128 away from its home and then drop it on certain features of user interface 124 for the purpose of obtaining and/or retrieving help documentation relevant to that feature.

Figure 8:
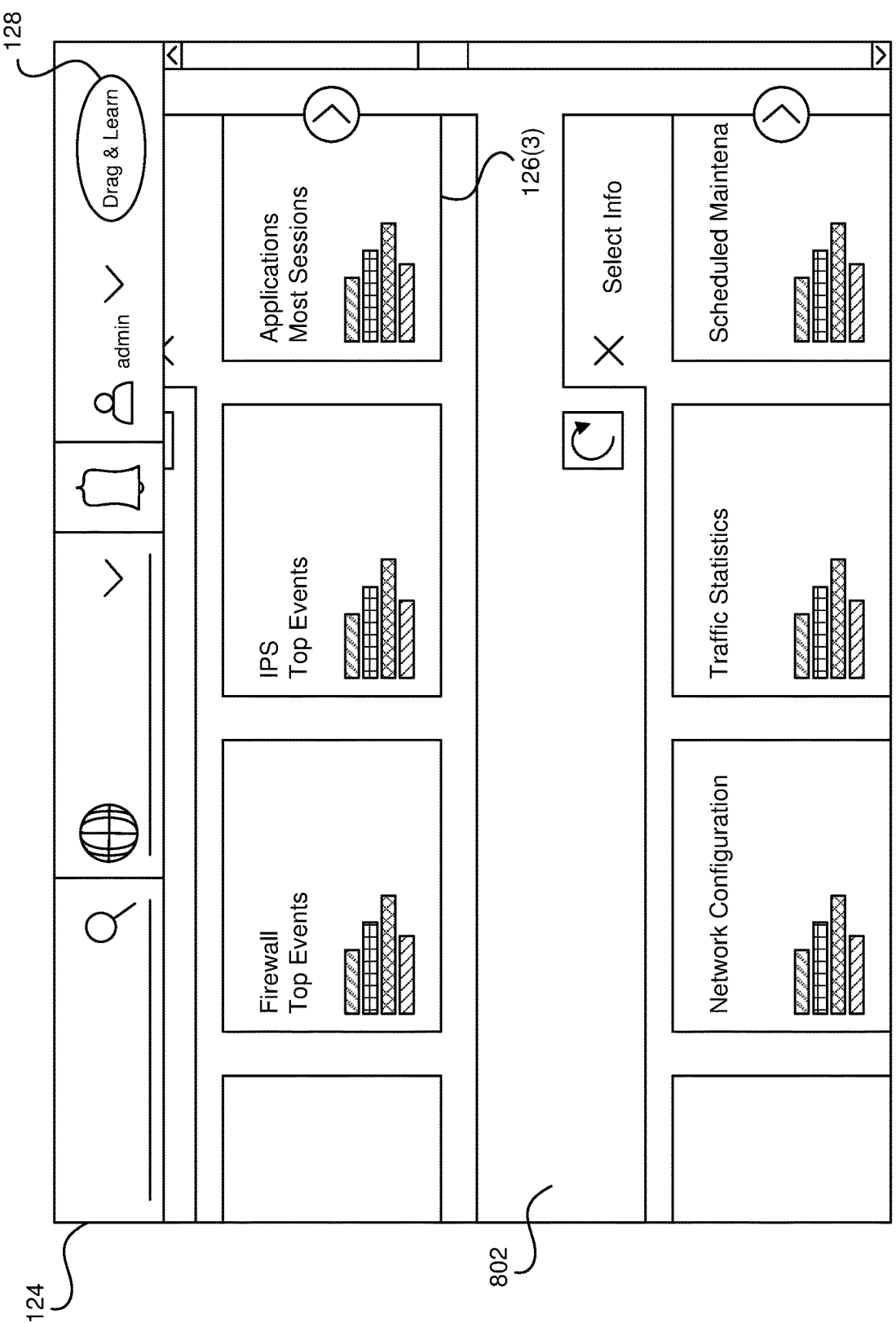
FIG. 8 is an illustration of an exemplary option in which a graphical drag-and-drop icon is docked at an origin within a GUI for access by a user.
Figure 9:
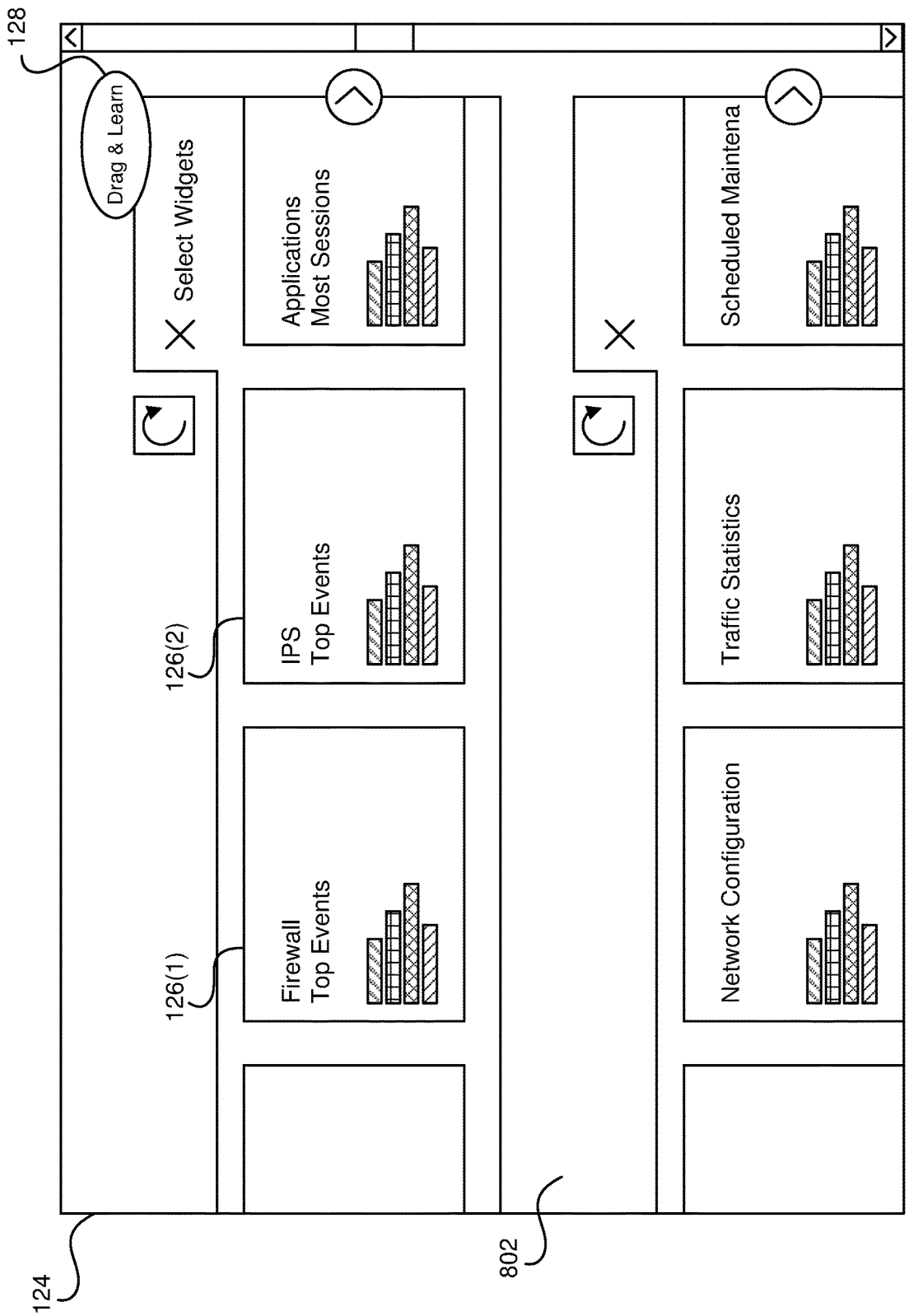
FIG. 9 is an illustration of an exemplary option in which a graphical drag-and-drop icon is docked at an origin within a GUI for access by a user.

Graphical drag-and-drop icon 128 may be incorporated and/or presented in user interface 124 in a variety of different ways and/or contexts. For example, FIGS. 8 and 9 illustrate exemplary positionings and designs of graphical drag-and-drop icon 128 as the user scrolls down user interface 124. As illustrated in FIG. 8, graphical drag-and-drop icon 128 may remain fixed atop user interface 124 as features 126(1)-(3) move upward within window 802 of user interface 124. In the example illustrated in FIG. 8, the origin of graphical drag-and-drop icon 128 may be incorporated into a control bar of user interface 124.

In contrast, the origin of graphical drag-and-drop icon 128 in FIG. 9 may remain at a stationary location and/or position within window 802 of user interface 124 as features 126(1)-(3) move upward within window 802 of user interface 124. In the example illustrated in FIG. 9, the origin of graphical drag-and-drop icon 128 may float and/or hover at this location and/or position without being incorporated into a control bar of user interface 124.

In other embodiments not illustrated in FIG. 8 or 9, the origin of graphical drag-and-drop icon 128 may move along with features 126(1)-(3) within window 802 of user interface 124. In such embodiments, graphical drag-and-drop icon 128 may disappear from view as features 126(1)-(3) move upward and/or downward beyond the scope of window 802.

Returning to FIG. 3, at step 320 one or more of the systems described herein may detect a drag action performed by the user on the graphical drag-and-drop icon relative to the user interface of the software application. For example, detection module 106 may, as part of computing device 202 and/or computing device 206 in FIG. 2, detect a drag action performed by the user on graphical drag-and-drop icon 128 relative to user interface 124 of software application 120. In one example, the drag action may amount to and/or represent movement of graphical drag-and-drop icon 128 from one location to another within and/or across user interface 124. In other words, the drag action may correspond to the user moving graphical drag-and-drop icon 128 within and/or across user interface 124 via a user-interface device (such as a mouse) and/or a cursor.

The systems described herein may perform step 320 in a variety of ways and/or contexts. In some examples, detection module 106 may monitor the location of graphical drag-and-drop icon 128 relative to user interface 124. While monitoring the location in this way, detection module 106 may detect movement from graphical drag-and-drop icon 128 relative to user interface 124. In other words, detection module 106 may determine that graphical drag-and-drop icon 128 is moving from one location to another within and/or across user interface 124.

In some examples, detection module 106 may detect the drag action by simply determining that the user has selected and/or picked up graphical drag-and-drop icon 128 from its origin within user interface 124. Additionally or alternatively, detection module 106 may detect the drag action by simply determining that graphical drag-and-drop icon 128 is no longer residing and/or located at its origin within user interface 124. Moreover, detection module 106 may detect the drag action in connection with the drop action, which is described in greater detail below. In other words, detection module 106 may determine that the user has dragged graphical drag-and-drop icon 128 from its origin as or after graphical drag-and-drop icon 128 is dropped on a feature of user interface 124.

Figure 5:
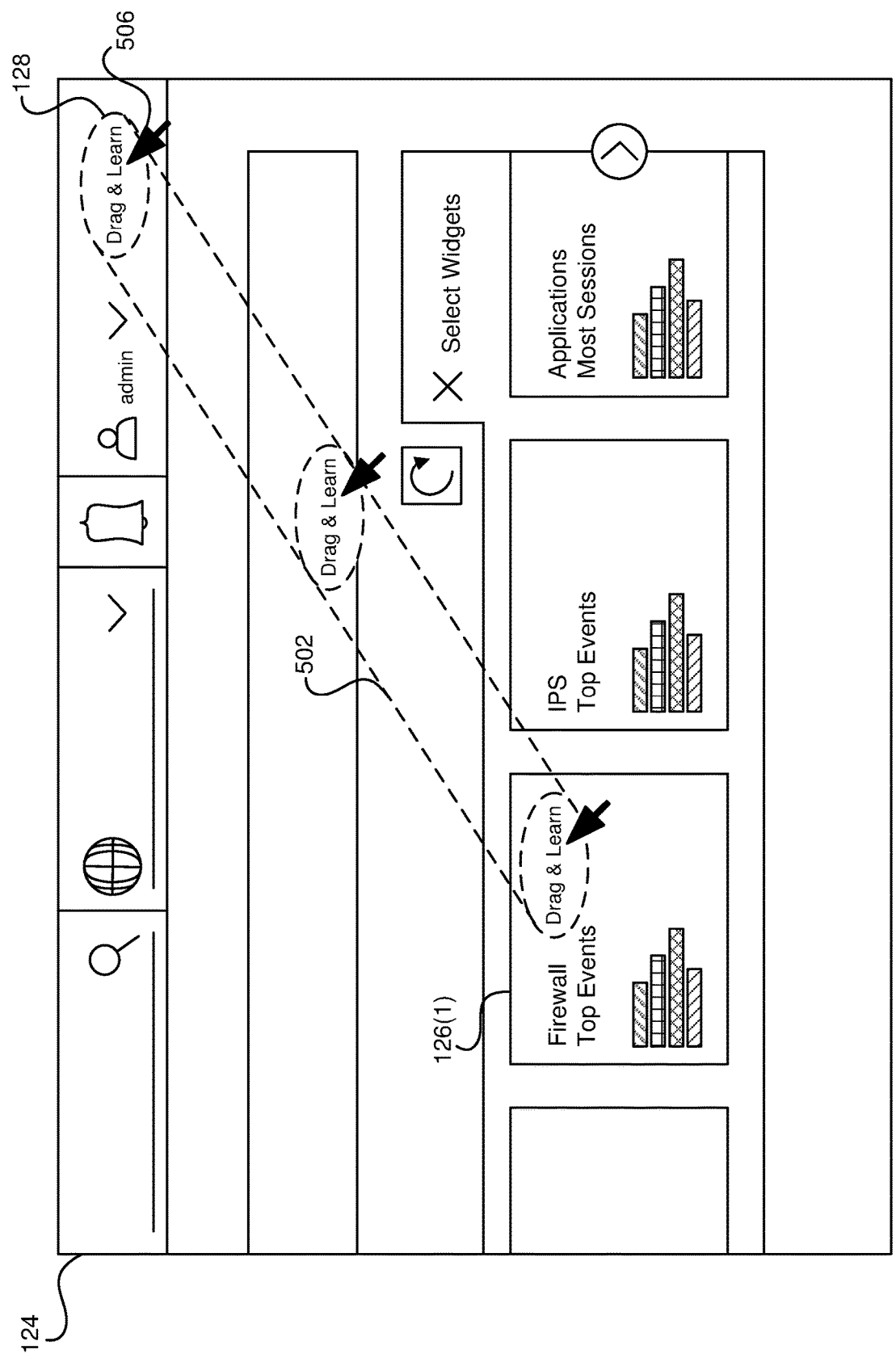
FIG. 5 is an illustration of an exemplary drag action performed by a user on a graphical drag-and-drop icon.

FIG. 5 illustrates an exemplary drag action 502 within and/or across user interface 124 of software application 120. As illustrated in FIG. 5, a cursor 506 may be controlled and/or manipulated by the user via any suitable user-interface device (such as a mouse). In one example, the user may direct cursor 506 to select and/or pick up graphical drag-and-drop icon 128 from the origin within user interface 124. In this example, the user may cause cursor 506 to drag and/or move graphical drag-and-drop icon 128 from its origin within user interface 124 to feature 126(1) within user interface 124.

Returning to FIG. 3, at step 330 one or more of the systems described herein may detect a drop action performed by the user on the graphical drag-and-drop icon relative to the user interface of the software application. For example, detection module 106 may, as part of computing device 202 and/or computing device 206 in FIG. 2, detect a drop action performed by the user on graphical drag-and-drop icon 128 relative to user interface 124 of software application 120. In one example, the drop action may amount to and/or represent a release and/or freeing of graphical drag-and-drop icon 128 on and/or above a certain feature of user interface 124.

The systems described herein may perform step 330 in a variety of ways and/or contexts. In some examples, detection module 106 may monitor graphical drag-and-drop icon 128 in connection with user interface 124. While monitoring graphical drag-and-drop icon 128 in this way, detection module 106 may detect a release and/or freeing of graphical drag-and-drop icon 128 from user control, selection, and/or hold. In other words, detection module 106 may determine that the user that picked up and/or selected graphical drag-and-drop icon 128 from its origin has now released and/or freed graphical drag-and-drop icon 128 within user interface

124. The location at which the user released and/or freed graphical drag-and-drop icon 128 within user interface 124 may differ from its origin.

For example, returning to FIG. 5, detection module 106 may detect a drop action performed by the user above and/or over feature 126(1) of user interface 124. In this example, the user may direct cursor 506 to release and/or free graphical drag-and-drop icon 128 while located above and/or over feature 126(1) of user interface 124. By doing so, the user may be able to convey, to computing device 202 and/or 206, his or her interest in obtaining and/or retrieving help documentation associated with feature 126(1) of user interface 124.

Figure 6:
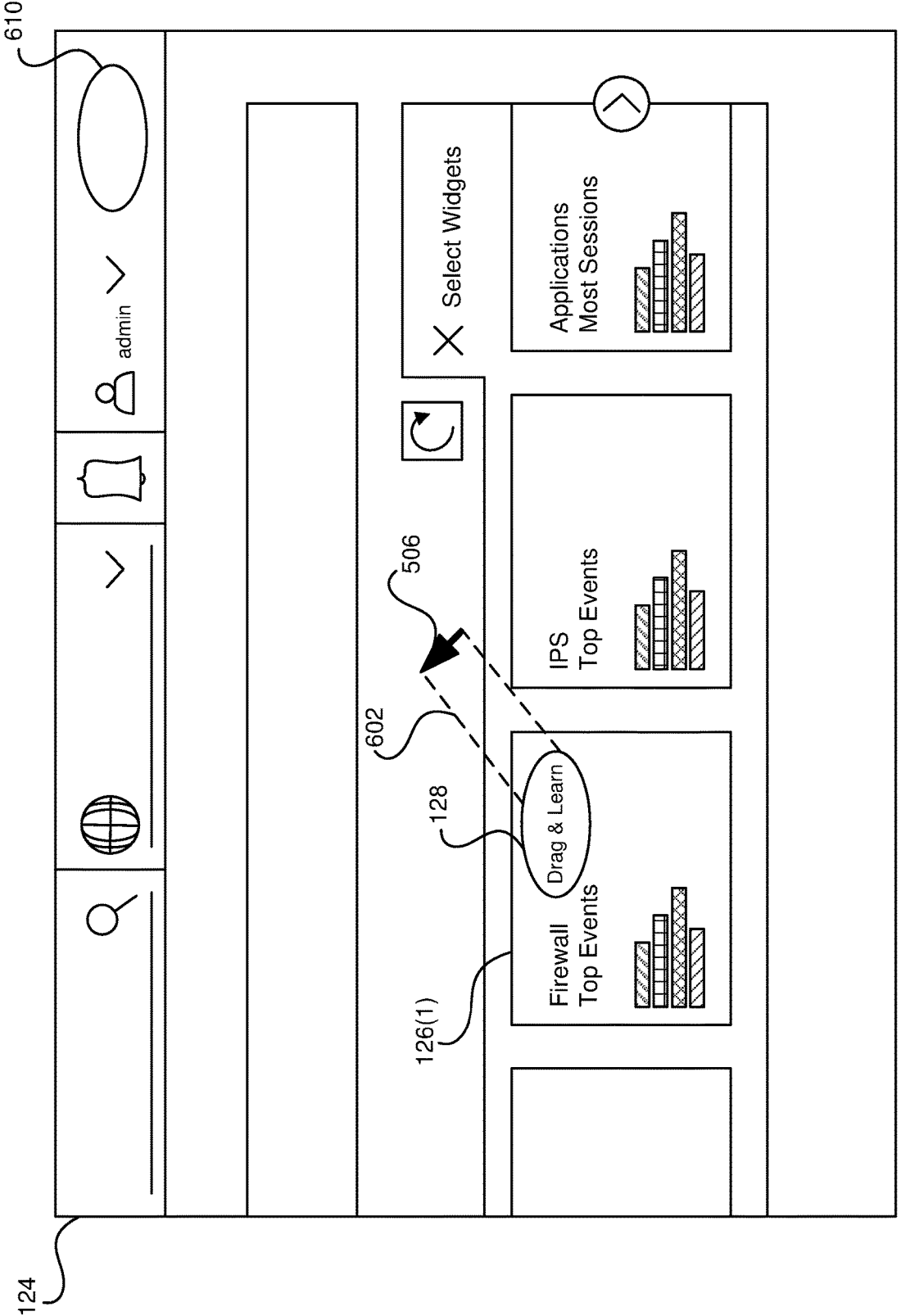
FIG. 6 is an illustration of an exemplary drop action performed by a user on a graphical drag-and-drop icon.

FIG. 6 illustrates an exemplary drop action 602 within and/or in connection with user interface 124 of software application 120. As illustrated in FIG. 6, cursor 506 may release and/or free graphical drag-and-drop icon 128 above and/or over feature 126(1) of user interface 124. In one example, after drop action 602 has occurred, cursor 506 may no longer be in control of graphical drag-and-drop icon 128. As further illustrated in FIG. 6, user interface 124 may include and/or incorporate an origin 610 of graphical drag-and-drop icon 128 where it resides, is docked, and/or returned when not in use.

Returning to FIG. 3, at step 340 one or more of the systems described herein may determine that the user dropped the graphical drag-and-drop icon on a specific feature of the user interface based at least in part on a location of the drop action relative to the user interface. For example, determination module 108 may, as part of computing device 202 and/or computing device 206 in FIG. 2, determine that the user dropped graphical drag-and-drop icon 128 on feature 126(1) of user interface 124. In one example, feature 126(1) of user interface 124 may correspond to and/or represent component 122(1) of software application 120. Accordingly, the user may be able to obtain and/or retrieve help documentation for component 122(1) of software application 120 by dropping graphical drag-and-drop icon 128 on feature 126(1) of user interface 124.

The systems described herein may perform step 340 in a variety of ways and/or contexts. In some examples, determination module 108 may know and/or determine the area of feature 126(1) within and/or relative to user interface 124. In such examples, determination module 108 may identify and/or determine the location at which the drop action occurred within and/or relative to user interface 124. In one example, determination module 108 may determine and/or conclude that the location of the drop action is within the area of feature 126(1) within user interface 124. In other words, determination module 108 may determine and/or conclude that the user dropped graphical drag-and-drop icon 128 within the area defined as and/or assigned to feature 126(1) within user interface 124.

In some examples, determination module 108 may identify and/or determine the component of software application 120 to which the drop action corresponds within user interface 124. For example, upon determining that the user dropped graphical drag-and-drop icon 128 on feature 126(1), determination module 108 may identify component 122(1) of software application 120 as corresponding to and/or being represented by feature 126(1) of user interface 124. As will be described in greater detail below, in response to the user having dropped graphical drag-and-drop icon 128 on feature 126(1) in this way, documentation module 110 may provide help documentation associated with component 122(1) of software application 120 for visual presentation to the user.

In some examples, determination module 108 may narrow the search of relevant help documentation due at least in part to the user having dropped graphical drag-and-drop icon 128 on feature 126(1) of user interface 124. For example, user-input module 112 may, as part of computing device 202 and/or computing device 206 in FIG. 2, receive user input 226 in FIG. 2 from the user (via, e.g., a keyboard or any other suitable user-interface device). In this example, the user may enter user input 226 into a chatbot included and/or incorporated into user interface 124 of software application 120.

In one example, user input 226 may include and/or represent information directed to a search for help documentation associated with a problem the user is facing and/or a question the user has. In this example, determination module 108 may identify and/or find various help documentation items and/or topics within documentation database 222 that match and/or correspond to feature 126(1) on which the user dropped graphical drag-and-drop icon 128. However, determination module 108 may further narrow and/or limit the relevant search results to those related in one way or another to both feature 126(1) and user input 226.

Similarly, determination module 108 may identify and/or find various help documentation items and/or topics within documentation database 222 that match and/or correspond to user input 226 received from the user. However, determination module 108 may further narrow and/or limit the relevant search results to those related in one way or another to both user input 226 and feature 126(1).

Returning to FIG. 3, at step 350 one or more of the systems described herein may provide help documentation associated with the specific feature of the user interface for visual presentation to the user. For example, documentation module 110 may, as part of computing device 202 and/or computing device 206 in FIG. 2, provide help documentation 220 associated with feature 126(1) for visual presentation to the user. In one example, documentation module 110 may initiate providing help documentation 220 for visual presentation in response to the determination that the user dropped graphical drag-and-drop icon 128 on feature 126(1). In the event that the user is operating computing device 202, documentation module 110 may ensure that help documentation 220 is provided for visual presentation on computing device 202.

In some examples, help documentation 220 may include and/or represent information about and/or instructions on how to use certain features of user interface 124. Additionally and/or alternatively, help documentation 220 may include and/or represent information about and/or instructions on how to perform certain tasks with one or more components of software application 120 via user interface 124. Further, help documentation 220 may include and/or represent information about and/or guidance on certain topics related to one or more components of software application 120.

The systems described herein may perform step 350 in a variety of ways and/or contexts. In some examples, documentation module 110 may search documentation database 222 in FIG. 2 for information, items, and/or topics that are specific to component 122(1) of software application 120 that corresponds to feature 126(1) of user interface 124. In such examples, upon finding such information, items, and/or topics during the search, documentation module 110 may organize it as and/or incorporate it into help documentation 220. Documentation module 110 may then provide help documentation 220 for visual presentation to the user. For example, documentation module 110 may direct and/or cause computing device 202 to display help documentation 220 within a modal and/or popup window associated with user interface 124 of software application 120.

Figure 7:
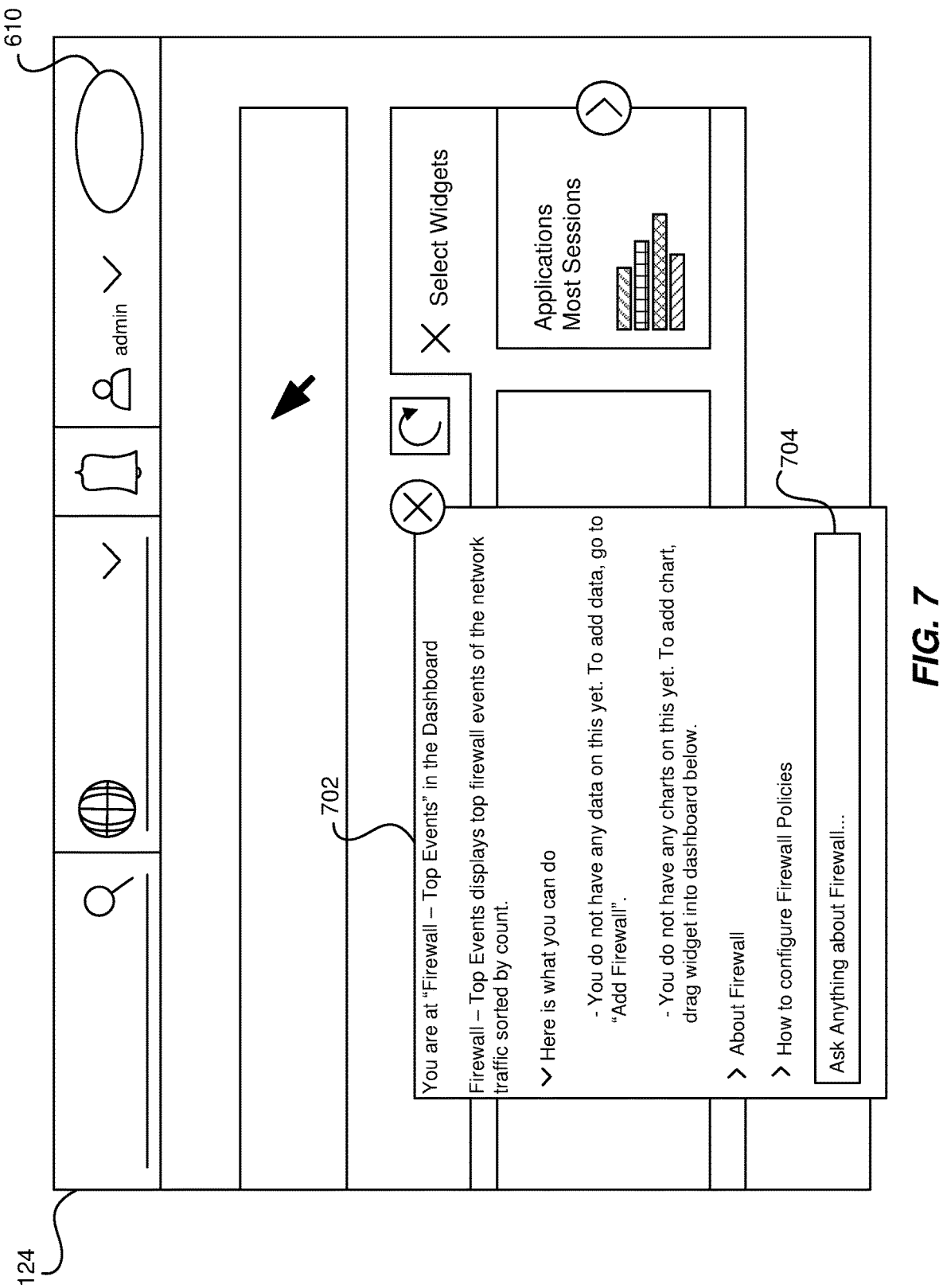
FIG. 7 is an illustration of exemplary help documentation relevant to a feature on which a user dropped a graphical drag-and-drop icon.

FIG. 7 illustrates an exemplary modal window 702 displayed atop and/or over user interface 124 of software application 120. As illustrated in FIG. 7, exemplary modal window 702 may include and/or contain help documentation that is specific to the top events associated with a firewall of software application 120. Accordingly, this help documentation may be specific to and/or associated with feature 126(1) on which the user dropped graphical drag-and-drop icon 128.

As further illustrated in FIG. 7, modal window 702 may include and/or incorporate a user-input box 704. In one example, user-input box 704 may enable the user to enter additional information about the topic for which he or she is seeking help documentation. In this example, user-input box 704 may serve and/or function as a chatbot in connection with modal window 702 and/or user interface 124.

In the event that the user enters user input into user-input box 704, user-input module 112 may receive the user input. In response to this user input, documentation module 110 may search for help documentation items and/or topics within documentation database 222 that match and/or correspond to the combination of feature 126(1) and the user input. In other words, documentation module 110 may search documentation database 222 within the limited context of feature 126(1) for help documentation items and/or topics related to the user input received from the user. Accordingly, documentation module 110 may narrow the search of help documentation relevant to feature 126(1) based at least in part on the user input.

Documentation module 110 may organize and/or manipulate the help documentation items and/or topics obtained from documentation database 222 in a variety of ways before presenting them to the user. For example, documentation module 110 may organize help documentation 220 into a listing of menu options for selection by the user. In one example, this listing may include and/or contain various sub-features of feature 126(1) and/or information that falls within the breadth and/or purview of feature 126(1) and/or component 122(1). For example, modal window 702 in FIG. 7 may include and/or contain a listing of different topics and/or events related to the firewall of software application 120. Additionally or alternatively, this listing may include links and/or Uniform Resource Locators (URLs) to other pages and/or information within software application 120 and/or accessible via the Internet.

In some examples, detection module 106 may detect a selection by the user of a menu option from the listing presented within modal window 702. In response to this selection, documentation module 110 may drill down help documentation 220 based at least in part on the selection. For example, in the event that the user selects the "Here is what you can do" option presented within modal window 702, documentation module 110 may direct computing device 202 to display and/or show one or more of the menu options related to what the user is able to do with the firewall of software application 120. Accordingly, documentation module 110 may identify a set of components, capabilities, features, and/or functions of software application 120 that are related to the user's selection and then provide a listing of that set for visual presentation to the user.

In some examples, detection module 106 may detect a selection by the user of one of those components, capabilities, features, and/or functions from the listing presented to the user. In response to this selection, documentation module 110 may provide help documentation that is specific to the user's selection.

In some examples, documentation module 110 may organize help documentation 220 based at least in part on the relevancy of its items to feature 126(1). For example, documentation module 110 may rank the menu options included in the listing of help documentation 220 in terms of relevancy to feature 126(1). In other words, documentation module 110 may rank such menu options from most relevant to least relevant within the listing. In one example, documentation module 110 may do so by positioning the menu option that is most relevant to feature 126(1) in the top spot within the listing. In this example, documentation module 110 may continue by positioning the menu option that is second-most relevant to feature 126(1) in the second spot (e.g., the spot just below the top spot) within the listing. Documentation module 110 may continue positioning the remaining menu options in this way and/or order within the listing in terms of relevance.

In some examples, the systems and methods described herein may enable the user to perform various searches of the available help documentation in any of the ways described above in connection with FIGS. 1-7. In one example, after the user is done with the help documentation visually presented to him or her in modal window 702, the user may close the modal window 702 to facilitate the ability to perform another search in connection with another one of features 126(1)-(N) of user interface 124. For example, detection module 106 may detect that the user has closed out modal window 702 and then dragged-and-dropped icon 128 on feature 126(3) of user interface 124. In response to these actions, documentation module 110 may close out modal window 702 and then open a new modal window with help documentation that is relevant to the component of software application 120 corresponding to feature 126(3).

In some examples, to prevent confusion, documentation module 110 may ensure that only one modal window that includes help documentation is visually presented to the user at any given time. Additionally or alternatively, documentation module 110 may highlight modal window 702 relative to the background of user interface 124 and/or darken one or more portions of user interface 124 relative to modal window 702. In one example, documentation module 110 may highlight the selected feature of user interface 124 relative to other portions of user interface 124 and/or darken the other portions of user interface 124 relative to the selected feature.

Figure 10:
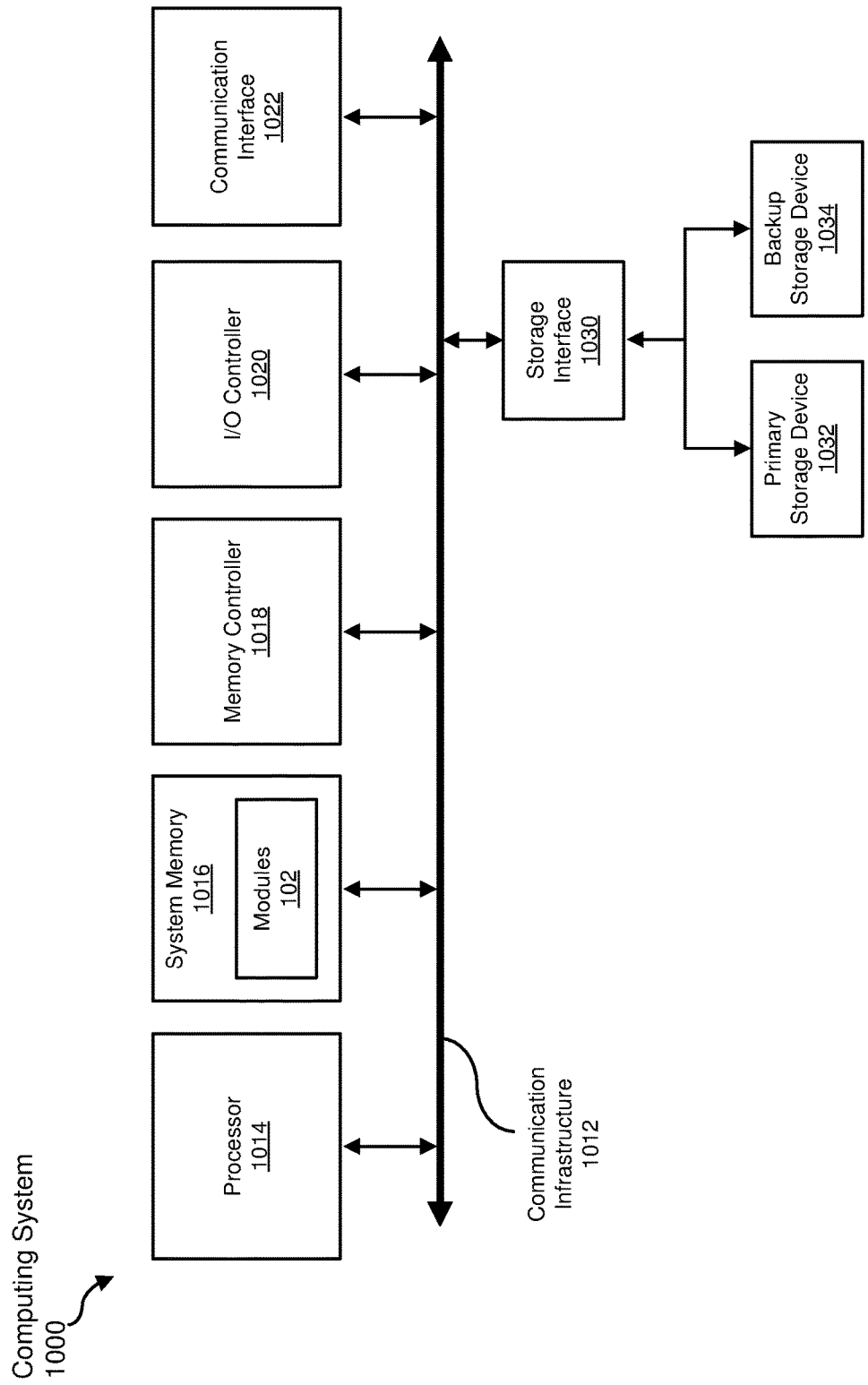
FIG. 10 is a block diagram of an exemplary computing system capable of implementing and/or being used in connection with one or more of the embodiments described and/or illustrated herein.

FIG. 10 is a block diagram of an exemplary computing system 1000 capable of implementing and/or being used in connection with one or more of the embodiments described and/or illustrated herein. In some embodiments, all or a portion of computing system 1000 may perform and/or be a means for performing, either alone or in combination with other elements, one or more of the steps described in connection with FIG. 3. All or a portion of computing system 1000 may also perform and/or be a means for performing and/or implementing any other steps, methods, or processes described and/or illustrated herein.

Computing system 1000 broadly represents any type or form of electrical load, including a single or multi-processor computing device or system capable of executing computer-readable instructions. Examples of computing system 1000 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/ or any other type or form of computing system or device.

Computing system 1000 may be programmed, configured, and/or otherwise designed to comply with one or more networking protocols. According to certain embodiments, computing system 1000 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1000 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 1000 may include various network and/or computing components. For example, computing system 1000 may include at least one processor 1014 and a system memory 1016. Processor 1014 generally represents any type or form of processing unit capable of processing data or interpreting and executing instructions. For example, processor 1014 may represent an application-specific integrated circuit (ASIC), a system on a chip (e.g., a network processor), a hardware accelerator, a general purpose processor, and/or any other suitable processing element.

Processor 1014 may process data according to one or more of the networking protocols discussed above. For example, processor 1014 may execute or implement a portion of a protocol stack, may process packets, may perform memory operations (e.g., queuing packets for later processing), may execute end-user applications, and/or may perform any other processing tasks.

System memory 1016 generally represents any type or form of volatile or non-volatile storage device or medium capable of storing data and/or other computer-readable instructions. Examples of system memory 1016 include, without limitation, Random Access Memory (RAM), Read Only Memory (ROM), flash memory, or any other suitable memory device. Although not required, in certain embodiments computing system 1000 may include both a volatile memory unit (such as, for example, system memory 1016) and a non-volatile storage device (such as, for example, primary storage device 1032, as described in detail below). System memory 1016 may be implemented as shared memory and/or distributed memory in a network device. Furthermore, system memory 1016 may store packets and/or other information used in networking operations.

In certain embodiments, exemplary computing system 1000 may also include one or more components or elements in addition to processor 1014 and system memory 1016. For example, as illustrated in FIG. 10, computing system 1000 may include a memory controller 1018, an Input/Output (I/O) controller 1020, and a communication interface 1022, each of which may be interconnected via communication infrastructure 1012. Communication infrastructure 1012 generally represents any type or form of infrastructure capable of facilitating communication between one or more components of a computing device. Examples of communication infrastructure 1012 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1018 generally represents any type or form of device capable of handling memory or data or controlling communication between one or more components of computing system 1000. For example, in certain embodiments memory controller 1018 may control communication between processor 1014, system memory 1016, and I/O controller 1020 via communication infrastructure 1012. In some embodiments, memory controller 1018 may include a Direct Memory Access (DMA) unit that may transfer data (e.g., packets) to or from a link adapter.

I/O controller 1020 generally represents any type or form of device or module capable of coordinating and/or controlling the input and output functions of a computing device. For example, in certain embodiments I/O controller 1020 may control or facilitate transfer of data between one or more elements of computing system 1000, such as processor 1014, system memory 1016, communication interface 1022, and storage interface 1030.

Communication interface 1022 broadly represents any type or form of communication device or adapter capable of facilitating communication between exemplary computing system 1000 and one or more additional devices. For example, in certain embodiments communication interface 1022 may facilitate communication between computing system 1000 and a private or public network including additional computing systems. Examples of communication interface 1022 include, without limitation, a link adapter, a wired network interface (such as a network interface card), a wireless network interface (such as a wireless network interface card), and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1022 may also represent a host adapter configured to facilitate communication between computing system 1000 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1022 may also enable computing system 1000 to engage in distributed or remote computing. For example, communication interface 1022 may receive instructions from a remote device or send instructions to a remote device for execution.

As illustrated in FIG. 10, exemplary computing system 1000 may also include a primary storage device 1032 and/or a backup storage device 1034 coupled to communication infrastructure 1012 via a storage interface 1030. Storage devices 1032 and 1034 generally represent any type or form of storage device or medium capable of storing data and/or other computer-readable instructions. For example, storage devices 1032 and 1034 may represent a magnetic disk drive (e.g., a so-called hard drive), a solid state drive, a floppy disk drive, a magnetic tape drive, an optical disk drive, a flash drive, or the like. Storage interface 1030 generally represents any type or form of interface or device for transferring data between storage devices 1032 and 1034 and other components of computing system 1000.

In certain embodiments, storage devices 1032 and 1034 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1034 may also include other similar structures or devices for allowing computer software, data, or other computer-readable instructions to be loaded into computing system 1000. For example, storage devices 1032 and 1034 may be configured to read and write software, data, or other computer-readable information. Storage devices 1032 and 1034 may be a part of computing system 1000 or may be separate devices accessed through other interface systems.

Many other devices or subsystems may be connected to computing system 1000. Conversely, all of the components and devices illustrated in FIG. 10 need not be present to practice the embodiments described and/or illustrated herein. The devices and subsystems referenced above may also be interconnected in different ways from those shown in FIG. 10. Computing system 1000 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
providing a graphical drag-and-drop icon for visual presentation to a user within a user interface of a software application;
docking the graphical drag-and-drop icon at an origin within the user interface of the software application for access by the user, wherein the origin serves as a home of the graphical drag-and-drop icon when the graphical drag-and-drop icon is not in use;
detecting a drag action performed by the user on the graphical drag-and-drop icon relative to the user interface of the software application, wherein the drag action comprises moving the graphical drag-and-drop icon from one location to another location within the user interface;
detecting a drop action performed by the user on the graphical drag-and-drop icon relative to the user interface of the software application, wherein the drop action comprises releasing the graphical drag-and-drop icon at the another location within the user interface;

determining, based at least in part on the another location at which the graphical drag-and-drop icon is released in the drop action, that the user dropped the graphical drag-and-drop icon on a specific feature of the user interface; and in response to determining that the user dropped the graphical drag-and-drop icon on the specific feature of the user interface, providing help documentation associated with the specific feature of the user interface for visual presentation to the user.

2. The method of claim 1, wherein:

determining that the user dropped the graphical drag-and-drop icon on the specific feature of the user interface comprises identifying a component of the software application that corresponds to the specific feature of the user interface; and providing the help documentation for visual presentation to the user comprises:

searching a documentation database for help documentation that is specific to the component of the software application that corresponds to the specific feature of the user interface; and upon finding the help documentation that is specific to the component of the software application in the documentation database, providing the help documentation for visual presentation to the user.

3. The method of claim 1, wherein providing the help documentation for visual presentation to the user comprises displaying the help documentation within a modal window associated with the user interface of the software application.

4. The method of claim 1, wherein the origin at which the graphical drag-and-drop icon is docked comprises a fixed location that remains stationary relative to the user interface as the user scrolls the user interface in a certain direction.

5. The method of claim 1, wherein the origin at which the graphical drag-and-drop icon is docked comprises a mobile location that moves relative to the user interface as the user scrolls the user interface in a certain direction.

6. The method of claim 1, further comprising receiving user input for a search of relevant help documentation; and wherein:

determining that the user dropped the graphical drag-and-drop icon on the specific feature comprises narrowing the search of relevant help documentation based at least in part on the user input and the specific feature on which the user dropped the graphical drag-and-drop icon; and providing the help documentation for visual presentation to the user comprises providing at least one result of the narrowed search of relevant help documentation for visual presentation to the user.

7. The method of claim 6, wherein narrowing the search of relevant help documentation comprises searching for information related to the user input within a context of the specific feature.

8. The method of claim 1, wherein providing the help documentation for visual presentation to the user comprises organizing the help documentation into a listing of menu options for selection by the user.

9. The method of claim 8, further comprising:

detecting a selection by the user of a menu option from the listing of menu options; and drilling down the help documentation based at least in part on the selection of the menu option by:

identifying a set of components of the software application that are related to the menu option selected by the user; and providing a listing of the set of components for visual presentation to the user.

10. The method of claim 9, further comprising:

detecting a selection by the user of a component from the listing of the set of components; and in response to detecting the selection of the component, providing help documentation that is specific to the component for visual presentation to the user.

11. The method of claim 8, wherein organizing the help documentation into the listing of menu options for selection by the user comprises:

ranking the menu options based at least in part on relevancy to the specific feature of the user interface; and organizing the help documentation by positioning:

a menu option most relevant to the specific feature in a top spot within the listing of menu options; and a menu option second-most relevant to the specific feature in a spot below the top spot within the listing of menu options.

12. A system comprising:

an icon module, stored in memory, that:

provides a graphical drag-and-drop icon for visual presentation to a user within a user interface of a software application; and docks the graphical drag-and-drop icon at an origin within the user interface of the software application for access by the user, wherein the origin serves as a home of the graphical drag-and-drop icon when the graphical drag-and-drop icon is not in use; and a detection module, stored in memory, that:

detects a drag action performed by the user on the graphical drag-and-drop icon relative to the user interface of the software application, wherein the drag action comprises moving the graphical drag-and-drop icon from one location to another location within the user interface;

detects a drop action performed by the user on the graphical drag-and-drop icon relative to the user interface of the software application, wherein the drop action comprises releasing the graphical drag-and-drop icon at the another location within the user interface;

a determination module, stored in memory, that determines, based at least in part on the another location at which the graphical drag-and-drop icon is released in the drop action, that the user dropped the graphical drag-and-drop icon on a specific feature of the user interface;

a documentation module, stored in memory, that provides help documentation associated with the specific feature of the user interface for visual presentation to the user in response to the determination that the user dropped the graphical drag-and-drop icon on the specific feature of the user interface; and at least one physical processor that executes the icon module, the detection module, the determination module, and the documentation module.

13. The system of claim 12, wherein:

to determine that the user dropped the graphical drag-and-drop icon on the specific feature of the user interface, the determination module identifies a component of the software application that corresponds to the specific feature of the user interface; and to provide the help documentation for visual presentation to the user, the documentation module:

searches a documentation database for help documentation that is specific to the component of the software application that corresponds to the specific feature of the user interface; and upon finding the help documentation that is specific to the component of the software application, provides the help documentation for visual presentation to the user.

14. The system of claim 12, wherein, to provide the help documentation for visual presentation to the user, the documentation module displays the help documentation within a modal window associated with the user interface of the software application.

15. The system of claim 12, wherein the origin at which the graphical drag-and-drop icon is docked comprises a fixed location that remains stationary relative to the user interface as the user scrolls the user interface in a certain direction.

16. The system of claim 12, wherein the origin at which the graphical drag-and-drop icon is docked comprises a mobile location that moves relative to the user interface as the user scrolls the user interface in a certain direction.

17. The system of claim 12, further comprising a user-input module, stored in memory, that receives user input for a search of relevant help documentation; and wherein:

to determine that the user dropped the graphical drag-and-drop icon on the specific feature, the determination module narrows the search of relevant help documentation based at least in part on the user input and the specific feature on which the user dropped the graphical drag-and-drop icon; and to provide the help documentation for visual presentation to the user, the documentation module provides at least one result of the narrowed search of relevant help documentation for visual presentation to the user.

18. A non-transitory computer-readable-storage medium comprising one or more computer-executable instructions that, when executed by at least one processor of a computing device, cause the computing device to:

provide a graphical drag-and-drop icon for visual presentation to a user within a user interface of a software application;

dock the graphical drag-and-drop icon at an origin within the user interface of the software application for access by the user, wherein the origin serves as a home of the graphical drag-and-drop icon when the graphical drag-and-drop icon is not in use;

detect a drag action performed by the user on the graphical drag-and-drop icon relative to the user interface of the software application, wherein the drag action comprises moving the graphical drag-and-drop icon from one location to another location within the user interface;

detect a drop action performed by the user on the graphical drag-and-drop icon relative to the user interface of the software application, wherein the drop action comprises releasing the graphical drag-and-drop icon at the another location within the user interface;

determine, based at least in part on the another location at which the graphical drag-and-drop icon is released in the drop action, that the user dropped the graphical drag-and-drop icon on a specific feature of the user interface; and provide help documentation associated with the specific feature of the user interface for visual presentation to the user in response to the determination that the user dropped the graphical drag-and-drop icon on the specific feature of the user interface.

* * * * *